United States Patent
Asad et al.

(10) Patent No.: US 12,458,548 B1
(45) Date of Patent: *Nov. 4, 2025

(54) WHEELCHAIR WITH EMERGENCY BRAKE SYSTEM

(71) Applicant: PRINCE MOHAMMAD BIN FAHD UNIVERSITY, Dhahran (SA)

(72) Inventors: Muhammad Asad, Dhahran (SA); Muhammad Azhar Ali Khan, Dhahran (SA); Mushtaq Khan, Dhahran (SA); Abdul Aziz Afzal, Dhahran (SA); Alanood Almoaikel, Dhahran (SA); Bayan Aljishi, Dhahran (SA); Lujain Alshuhail, Dhahran (SA); Zainab Alsaigh, Dhahran (SA)

(73) Assignee: PRINCE MOHAMMAD BIN FAHD UNIVERSITY, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 19/231,053

(22) Filed: Jun. 6, 2025

(51) Int. Cl.
*A61G 5/10* (2006.01)
*F16D 59/00* (2006.01)
(Continued)

(52) U.S. Cl.
CPC .......... *A61G 5/1016* (2013.01); *F16D 59/00* (2013.01); *F16D 65/22* (2013.01); *F16D 2121/14* (2013.01)

(58) Field of Classification Search
CPC .. A61G 5/1016; A61G 5/1005; A61G 5/1021; A61G 5/1013; A61G 5/1027; F16D 59/00; F16D 65/22; F16D 2121/14
See application file for complete search history.

(56) References Cited

U.S. PATENT DOCUMENTS 4,537,415 A * 8/1985 Delahoussaye ...... A61G 5/1035
188/2 F
5,197,750 A * 3/1993 DiGeorge ............ A61G 5/1027
D12/133
(Continued)

FOREIGN PATENT DOCUMENTS

CN 204296998 U 4/2015
CN 207078255 U 3/2018
(Continued)

OTHER PUBLICATIONS

U.S. Appl. No. 19/221,704, filed May 29, 2025, Asad, et al.
U.S. Appl. No. 19/231,257, filed Jun. 6, 2025, Asad, et al.
U.S. Appl. No. 19/231,303, filed Jun. 6, 2025, Asad, et al.

*Primary Examiner* — Valentin Neacsu
*Assistant Examiner* — Abigail R Hymel
(74) *Attorney, Agent, or Firm* — Oblon, McClelland, Maier & Neustadt, L.L.P.

(57) ABSTRACT

A wheelchair having an emergency brake system in which a wheel of the wheelchair has a hub, a rim, spokes extending between the hub and rim, and a rod extending between the hub and rim. A helical spring surrounds the rod, with a fixed end attached to the hub and a free end movable along the longitudinal direction of the rod. A brake mass structure is attached to the free end of the helical spring and includes a pin structure. A main frame connects to the hub of the wheel. An extension structure extends from the main frame and includes a spacing segment and a hook segment having a groove configured to engage with the pin structure. At a speed threshold, the pin structure engages the groove of the hook segment to prevent acceleration of the wheelchair.

15 Claims, 10 Drawing Sheets

(51) Int. Cl.
*F16D 65/22* (2006.01)
*F16D 121/14* (2012.01)

(56) References Cited

U.S. PATENT DOCUMENTS

| | | | | |
|---|---|---|---|---|
| 8,622,178 B2* | 1/2014 | Jowers | ............ | A61G 5/1054 |
| | | | | 188/78 |
| 2005/0248121 A1* | 11/2005 | Ford | ............ | A61G 5/1037 |
| | | | | 280/304.1 |
| 2018/0042796 A1* | 2/2018 | Gingras | ............ | A61G 5/1018 |
| 2020/0188201 A1* | 6/2020 | McColl | ............ | A61G 5/1013 |

FOREIGN PATENT DOCUMENTS

| CN | 109292033 A | 2/2019 |
|---|---|---|
| CN | 118004318 A | 5/2024 |

\* cited by examiner

WHEELCHAIR WITH EMERGENCY BRAKE SYSTEM

BACKGROUND

Technical Field

The present disclosure is directed to a wheelchair including an emergency braking system and, more particularly, a wheelchair configured to automatically engage a brake in an emergency situation.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Wheelchairs often require effective braking systems to ensure user safety, particularly when navigating declined surfaces or high-acceleration environments. Conventional braking systems predominantly include mechanical brakes, which utilize frictional engagement between brake pads and wheel rims/discs, and electric braking systems, which employ motor-generated resistance or electronically actuated braking elements. The aforementioned systems permit a user to manually or automatically control deceleration and stopping of the wheeled device during regular operation.

However, current braking systems exhibit significant limitations, specifically in emergency scenarios. Mechanical brakes are susceptible to degradation due to progressive wear of brake pads, contamination, misalignment, and failure of mechanical linkages. Over time, reduced frictional efficiency diminishes braking performance, potentially resulting in delayed and insufficient deceleration. Similarly, electric braking systems depend heavily on electrical components and power sources. Electrical faults such as wiring failures, sensor malfunctions, battery depletion, or controller errors may render the braking system inoperative without advance notice. In emergency situations, such as an individual losing consciousness while operating a wheelchair on a downhill slope, any delay or inability to actuate the brake system may cause the wheeled device to accelerate uncontrollably, posing severe safety risks to the user and bystanders.

Existing solutions attempting to address emergency braking typically involve complex electronic monitoring systems, redundant brake actuation circuits, or supplementary manual mechanisms. The foregoing approaches often increase system complexity, cost, and maintenance requirements. Moreover, such systems continue to depend on user intervention, electronic actuation, or auxiliary power sources, consequently inheriting a plurality of vulnerabilities associated with traditional mechanical and electrical braking architectures. In the absence of active user input or available electrical energy, such systems may fail to deliver reliable braking response when most critically needed.

In CN207078255U, a rear wheel drives a track to rotate, and under an action of centrifugal force, a slider moves toward a rear end of the track. As a vehicle speed increases, a centrifugal force on the slider increases. When the vehicle speed reaches a certain level, the iron sheet will touch a steel ring, and friction will be generated between the iron sheet and the steel ring. This friction will inhibit the bicycle from further accelerating. However, the aforementioned does not mention a locking mechanism and brake mass.

In CN204296998U, a slider will stay at an end closer to a wheel rim under an action of a returning spring. When the wheel rotates, the slider will slide under the action of centrifugal force. When the vehicle speed increases to a certain extent, the slider moves to touch a contact piece, or rather, a column on the slider touches a magnetic contact piece, so that a control switch is actuated and the alarm device is activated to alarm. When the vehicle speed further increases, the slider moves further so that the column contacts a control piece, and the control piece rotates, so that the brake pad contacts the wheel, and the car is decelerated. After the car is decelerated, under the action of the return spring, the slider returns to the end closer to the wheel axle, and the car drives normally. However, the aforementioned disclosure includes electrical elements.

Each of the aforementioned references suffers from one or more drawbacks hindering their adoption. Hence, there is a need for a brake system for wheelchairs that operates independently of manual actuation, electrical power, or external control systems. Accordingly, one object of the present disclosure is to provide a wheelchair having an emergency brake system.

SUMMARY

The present disclosure describes a wheelchair with emergency brake system that has an emergency brake system. The wheelchair has at least one braking wheel equipped with a brake system. The wheelchair has a main frame, a seat supported by the main frame, an upper frame, a backrest supported by the upper frame, two front wheels connected to the main frame and two rear wheels connected to the main frame. The braking wheel comprises a hub, a rim, spokes extending between the hub and the rim, a rod extending between the hub and the rim, a helical spring surrounding the rod and having a fixed end attached to the hub and a free end capable of moving along a longitudinal direction of the rod, and a brake mass structure attached to the free end of the helical spring, being capable of moving along the longitudinal direction of the rod and comprising a pin structure. The main frame of the wheelchair is connected to the hub of the braking wheel and an extension structure comprising a spacing segment that extends from the main frame, and a hook segment spaced apart from the hub by the spacing segment and having a groove formed therein which is configured to engage with the pin structure of the brake mass structure. When the braking wheel rotates, the brake mass structure is configured to move away from the hub along the longitudinal direction of the rod. When the braking wheel rotates at or above a speed threshold, the brake mass structure is configured to move away from the hub along the longitudinal direction of the rod so that the pin structure of the brake mass structure engages with the groove of the hook segment of the extension structure to stop the wheelchair from accelerating.

In an embodiment of the disclosure, the wheelchair has two wheels equipped with the brake system.

In an embodiment of the disclosure, the brake mass structure comprises a plate having a through-hole formed therein, the rod extends through the through-hole so that the brake mass structure is capable of moving along the longitudinal direction of the rod, the pin structure is cylindrical, and a longitudinal direction of the pin structure is perpendicular to the longitudinal direction of the rod.

In an embodiment of the disclosure, the pin structure extends outwardly from the plate, and the longitudinal direction of the pin structure is parallel to the plate.

In an embodiment of the disclosure, the groove of the hook segment is semi-circular and capable of accommodating the pin structure.

In an embodiment of the disclosure, the hub comprises a hub axel and two hub flanges spaced along a longitudinal direction of the hub axel that is perpendicular to a plane of the rim.

In an embodiment of the disclosure, the rod is attached to the rim and the hub axel.

In an embodiment of the disclosure, the spokes are attached to the rim and at least one of the two hub flanges.

In an embodiment of the disclosure, the spacing segment of the extension structure is in direct contact with and extends from the main frame.

In an embodiment of the disclosure, the spacing segment of the extension structure is fixedly attached to the main frame.

In an embodiment of the disclosure, the speed threshold is determined by $$\sqrt{\frac{R(kx - mg)}{m}},$$

in which:
R is a length of the rod,
k is a spring constant of the helical spring,
x is a displacement of the helical spring from an equilibrium position of the helical spring,
m is a mass of the brake mass structure, and
g is a gravitational constant.

In an embodiment of the disclosure, the extension structure and the main frame are fixedly attached to each other and form one integral piece.

In an embodiment of the disclosure, when the braking wheel rotates at or above the speed threshold, the brake mass structure is configured to move away from the hub along the longitudinal direction of the rod so that the pin structure of the brake mass structure engages with the groove of the hook segment of the extension structure to stop the braking wheel from rotating.

In an embodiment of the disclosure, the brake system does not include a pressor sensor, a force sensor or a speed sensor.

In an embodiment of the disclosure, the brake system does not include a sensor that is configured to measure a property when the braking wheel rotates at or above the speed threshold, the brake mass structure is configured to move away from the hub along the longitudinal direction of the rod so that the pin structure of the brake mass structure engages with the groove of the hook segment of the extension structure to stop the wheelchair from accelerating.

In an embodiment of the disclosure, the brake system does not include a sensor positioned on the main frame, the extension structure or any wheel of the wheelchair.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings.

DETAILED DESCRIPTION

Figure 1A:
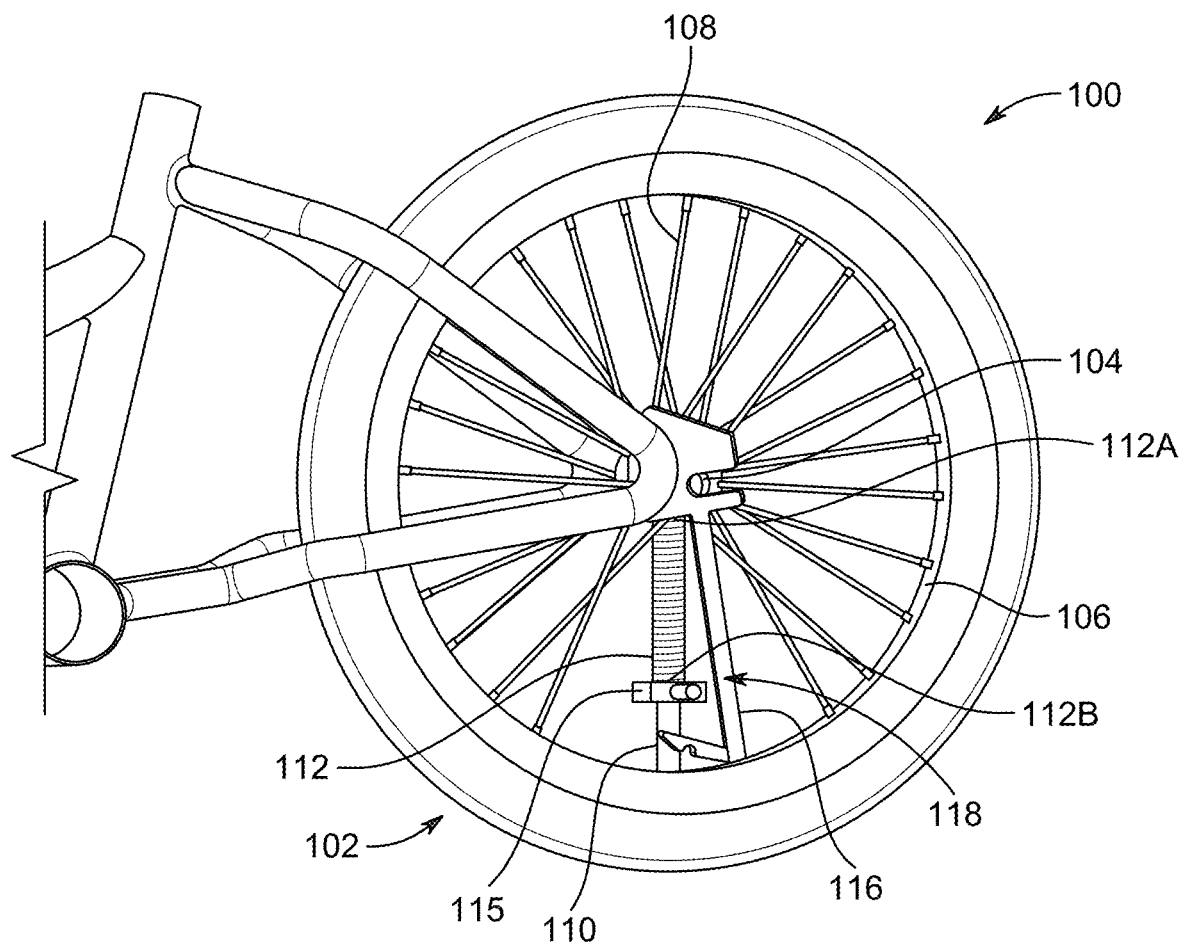
FIG. 1A illustrates a schematic perspective view of a brake system for a wheeled device, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a brake system for a wheelchair that autonomously regulates wheel acceleration based on rotational speed thresholds without requiring manual actuation or electrical input. The brake system as disclosed herein is configured to provide consistent and reliable braking performance under both normal and emergency conditions. The system disclosed herein addresses certain challenges by utilizing centrifugal and gravitational forces to trigger a braking event, which provides a passive, fail-safe mechanism. By integrating mechanical structures such as a wheel-mounted brake mass, helical spring arrangement, and frame-coupled extension components, the brake system provides speed-dependent braking engagement without necessarily relying on external energy sources or manual input.

Figure 1B:
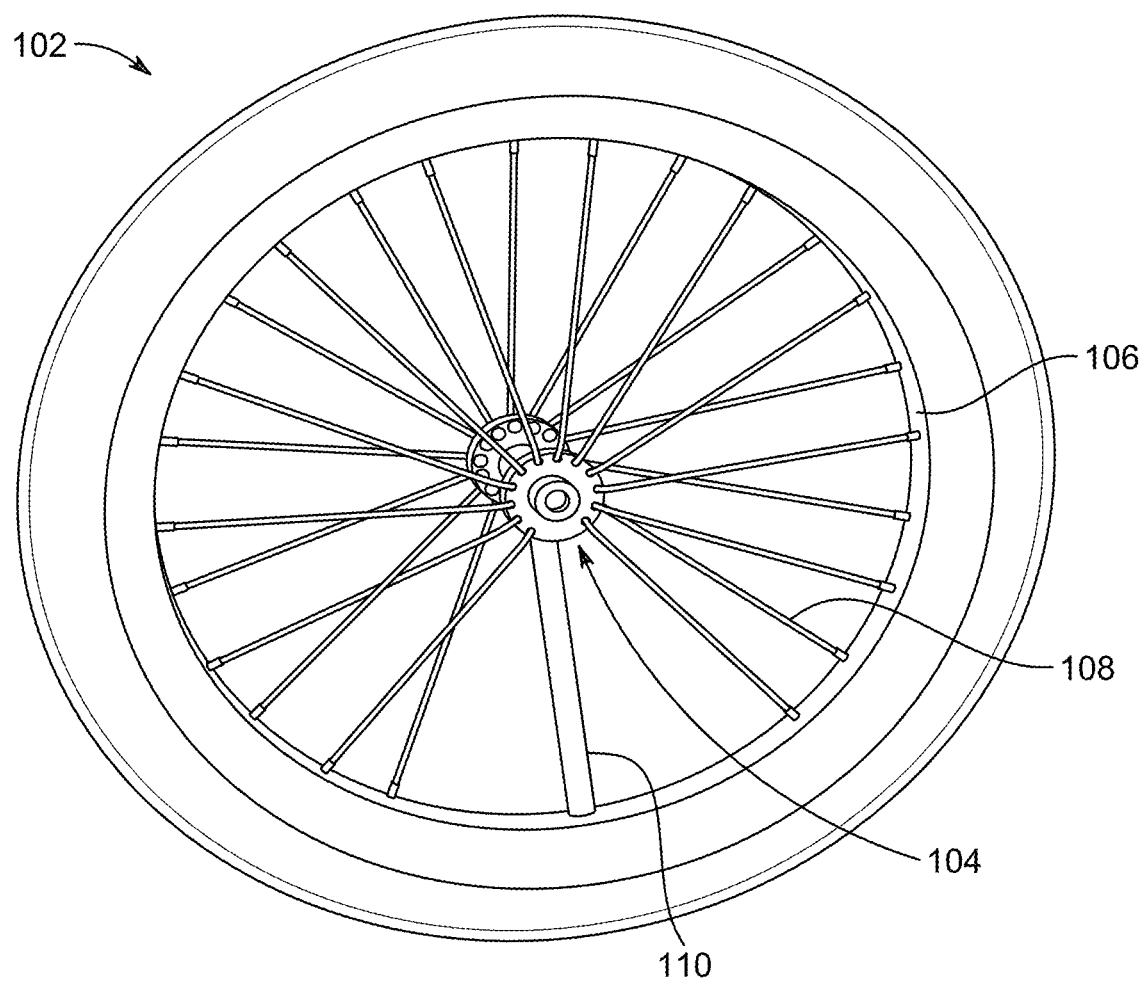
FIG. 1B illustrates a schematic of a wheel, depicting a linear rod structure, according to certain embodiments.
Figure 1C:
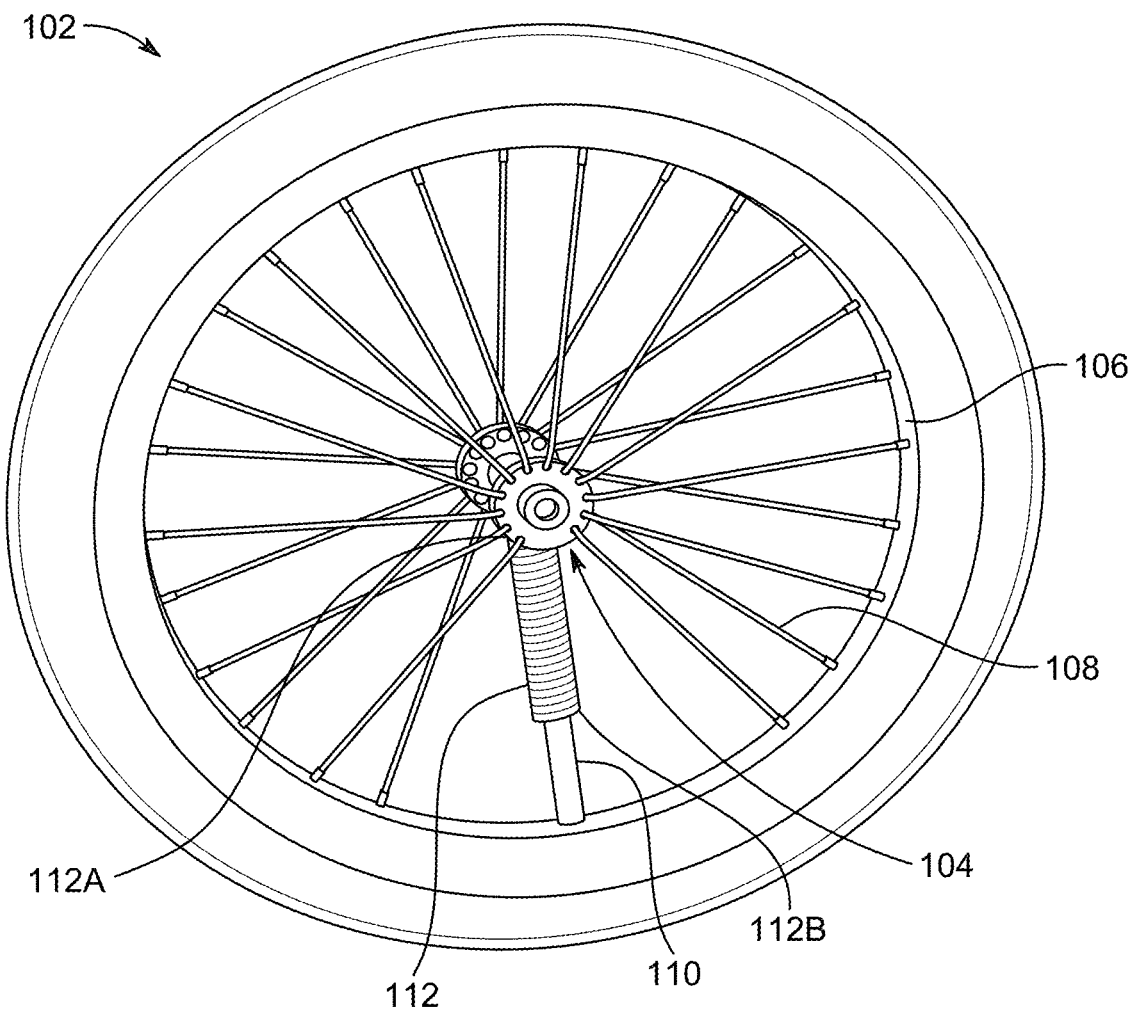
FIG. 1C illustrates a schematic of a brake system for a wheel, according to certain embodiments.

Referring to FIGS. 1A-1C, schematic perspective views of a brake system 100 for a wheeled device are illustrated, according to certain embodiments. The figures presented here describe application of the brake system to a wheeled device. The structure of the wheelchair brake system is the same but for inclusion on a 4-wheeled wheelchair.

In the present disclosure the wheelchair includes components similar to conventional wheelchairs such as a seat, a backrest portion with an upper frame mounted approximately perpendicular to the seat portion and a main frame connected to the upper frame transversely of the upper frame and supporting the seat. Hand grips are mounted on the upper frame. Front wheels and rear wheels are connected to the main frame with rear wheels larger than the front wheels. Footrests may be connected to the main frame above the front wheels and below the seat. Armrests may be connected to the upper frame or main frame to provide a resting surface for the arms of an individual sitting in the seat. A convention locking brake engageable by an individual sitting in the seat may be present on one or both sides of the wheelchair. The main frame is approximately perpendicular to the ground plane of the wheels. A backrest is preferably included in the upper frame and may be detachably mounted to the upper frame. A wheelchair such as a commercially available wheelchair from Drive Medical (e.g., Model No. SSP118FA-SF) may be used as the wheelchair portion in aspects of the present disclosure. The wheelchair of the present disclosure may share components of the wheelchair described in U.S. Pat. No. 7,597,339 which is incorporated herein by reference in its entirety.

In particular, FIG. 1A depicts a schematic rear section view of the wheeled device, illustrating an overview of the brake system 100, FIG. 1B depicts a schematic view of a wheel 102 included in the brake system 100 with certain components, and FIG. 1C depicts yet another component of the brake system 100, explained in detail hereinafter. The brake system 100 may be interchangeably referred to as the "system 100", hereinafter without any limitations. According to the present disclosure, the brake system 100 includes the wheel 102, as described above. In one embodiment, the wheel 102 is a rear wheel, of a wheelchair.

Further, the wheel 102 includes a hub 104, a rim 106, and a plurality of spokes 108 extending between the hub 104 and the rim 106. The spokes 108 provide structural integrity and load distribution between the hub 104 and the rim 106 and maintain rotational balance and mechanical stability of the wheel 102 during operation. Each spoke of the plurality of spokes 108 may be constructed from high-strength stainless steel, carbon fiber-reinforced polymer composites, or high-tensile aluminium alloys to provide desirable fatigue resistance and weight distribution. In certain embodiments, the spokes 108 may adopt bladed or aerodynamic profiles to reduce rotational drag.

As can be seen from FIG. 1B, the wheel 102 further includes a rod 110 extending between the hub 104 and the rim 106. The rod 110 may be positioned substantially radially with respect to an axis of rotation 'R' of the wheel 102. In some embodiments, the rod 110 may be fabricated from rigid materials such as stainless-steel alloys including AISI 304 or AISI 316, hardened carbon steel, titanium alloys, or high-performance fiber composites, depending on the weight, strength, and corrosion resistance requirements of an application of the wheeled device. In some embodiments, surface coatings such as ceramic layers, hard anodization, and polytetrafluoroethylene (PTFE) films may be applied to the rod 110 in order to reduce frictional losses and resist environmental degradation. Preferably, the rod 110 has a larger diameter (or a larger cross-sectional area) than the spokes 108. For example, a diameter of the rod 110 can be 2-times, preferably 3-8 times, preferably 4-6 times, of an average diameter of the spokes 108. A length of the rod 110 is equal or substantially equal to an average length of the spokes 108, both of which can represent a distance between the hub 104 and the rim 106.

Conventionally, spokes are uniformly distributed or evenly spaced along a hub or along an inner circumference of a rim. However in the brake system 100, the rod 110 defines a spoke-free zone such that the spokes 108 can be uniformly distributed or evenly spaced along the hub 104 or along an inner circumference of the rim 106 outside the spoke-free zone. For instance to manufacture the wheel 102, one or more (e.g. two) spokes can be removed from a wheel having evenly spaced spokes to obtain the spoke-free zone where the rod 110 can be installed.

Further, the brake system 100 includes a helical spring 112 surrounding the rod 110. The helical spring 112 includes a fixed end 112A attached to the hub 104 and a free end 112B capable of moving along a longitudinal direction of the rod 110. Specifically, the helical spring 112 can be concentrically mounted on the rod 110, such that the rod 110 extends longitudinally through a central axis of the helical spring 112. The fixed end 112A of the helical spring is anchored to a spring-retention interface positioned adjacent to the hub 104, which may include a radial flange, integrated collar, or seat portion formed on the hub body. Furthermore, the helical spring 112 may be fabricated from high-tensile spring steel typically of ASTM A228 music wire standard, oil-tempered chromium-silicon steel, and corrosion-resistant stainless-steel alloys such as 17-7 PH. In some embodiments, the helical spring 112 may be constructed from any other material available, based on an area of employment of the wheeled device. In certain embodiments, the helical spring 112 may incorporate specialized surface treatments such as, but not limited to, shot peening, nitriding, electropolishing in order to improve fatigue life, corrosion resistance, and surface finish.

Referring back to FIG. 1A, the brake system 100 includes a brake mass structure 115 and an extension structure 118. The extension structure may be connected to the main frame or upper frame of the wheelchair. The extension structure 118 includes a spacing segment 116 and a hook segment 120, which will be explained in greater detail in FIGS. 2A-2C.

Figure 2A:
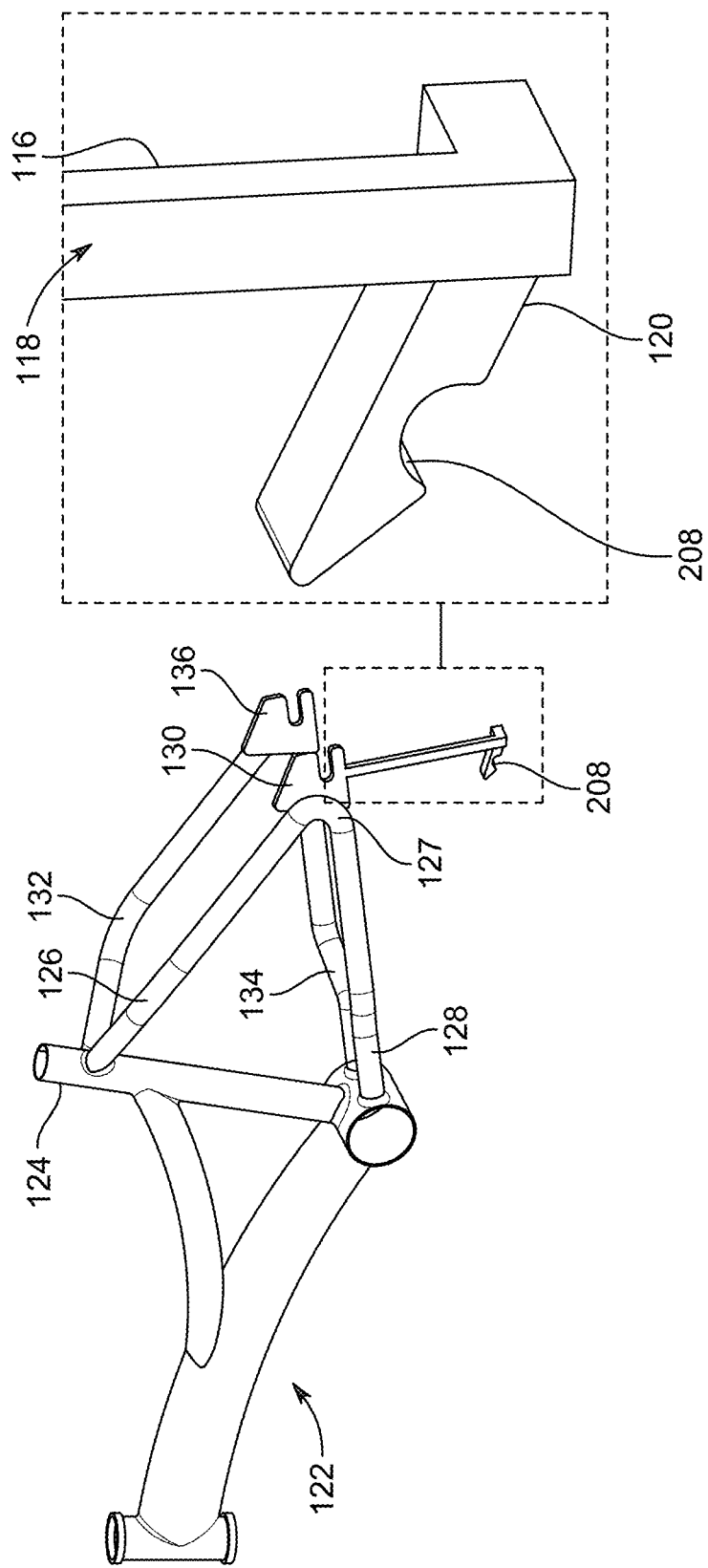
FIG. 2A illustrates a schematic of a main frame of the wheeled device, with an enlarged inset depicting an extension structure incorporated therein, according to certain embodiments.
Figure 2B:
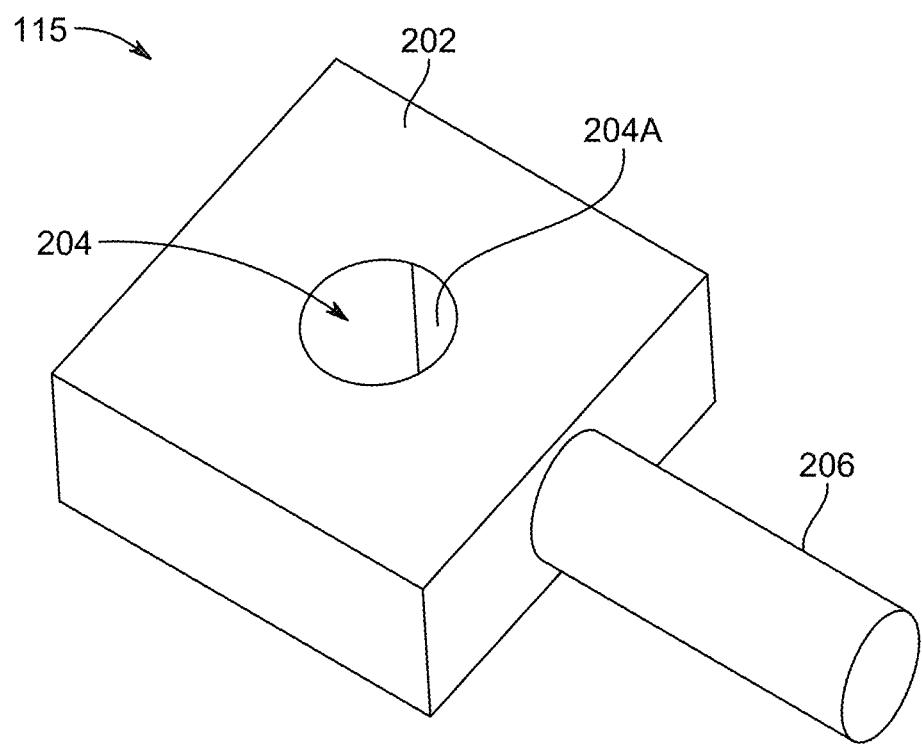
FIG. 2B illustrates a schematic of a brake mass structure incorporated in the brake system, according to certain embodiments.

Referring to FIGS. 2A-2B, illustrated are schematic perspective diagrams of a main frame 122 with the brake system 100 attached thereon, and detailed view of the brake mass structure 115, according to certain embodiments. The brake system of the present disclosure is adapted to a wheelchair based on the description information provided herein. As can be seen from FIGS. 1A and 2A, the brake system 100 includes the main frame 122 connected to the hub 104 of the wheel 102. The extension structure 118 is configured to interact with the brake mass structure 115. The main frame 122 may be manufactured from structural steel, aluminium alloys such as 6061-T6 or 7075-T6, magnesium alloys, and reinforced polymer composites to balance strength, durability, and weight considerations. Surface treatments such as powder coating, anodizing, automotive paint, and electroplating may be applied to the main frame 122 to enhance environmental resistance. In some embodiments, the extension structure 118 includes the spacing segment 116 extending from the main frame 122, as shown in FIG. 2A. The spacing segment 116 establishes a predetermined distance between the hub 104 and the hook segment 120 of the extension structure 118. The spacing segment 116 may be formed from similar materials as the main frame 122 and may adopt a tubular, box, or beam profile to provide high mechanical rigidity and simultaneously provide low mass. Further, the hook segment 120 is configured to be a structural projection that is configured at an end of the spacing segment 116, where the hook segment 120 is placed at an angle with regard to the spacing segment 116. For example, the hook segment 120 can be perpendicular to a direction of the spacing segment 116 and parallel to a ground in contact with the wheeled device.

Referring again to FIG. 2A, the main frame 122 serves as a primary structural chassis for the wheeled device and is configured to securely support and align with the components of the brake system 100, including the extension structure 118 and a plurality of associated braking sub-mechanism. In some embodiments, the extension structure 118 and the main frame of the wheelchair are removably or fixedly attached to each other and are separate components. In some embodiments, the extension structure 118 and the main frame of the wheelchair are fixedly attached to each other and form one integral, seamless, monolithic or unitary piece. The foregoing unitary construction may be achieved via monolithic casting, additive manufacturing, or integrative welding of the extension structure 118 directly to the main frame of the wheelchair. Such a configuration provides mechanical stability for the extension structure 118 and suppresses relative displacement between the hook segment 120 and the brake mass structure 115 when engaged, maintaining alignment for engagement during high-speed rotation of the wheel 102.

For perspective, the main frame 122 includes an optional seat tube 124 (preferably not present on the wheelchair of the present disclosure), an optional first seat stay 126, an optional first chain stay 128, an optional first rear dropout 130 (e.g., a point of connection to the main frame), an optional second seat stay 132, an optional second chain stay 134, and an optional second rear dropout 136, structurally arranged to define two rear frame triangles capable of enclosing and supporting the wheel 102. The optional seat tube 124 may extend vertically or at an inclined angle from a bottom bracket region to a seating support zone. The seat tube 124 may be fabricated from materials including, but not limited to, drawn steel tubing such, hydroformed aluminium, titanium alloy, and high modulus carbon fiber prepregs for weight-sensitive applications. The seat tube 124 may include internal reinforcement sleeves or gusseted weld interfaces to support dynamic stress concentrations near joints with the seat stays and bottom bracket.

The first seat stay 126 and second seat stay 132 extend rearward and downward from the seat tube 124, respectively. Further, in some embodiments, the first seat stay 126 is configured to be mechanically coupled to the first chain stay 128 via a first connecting member 127, and the second seat stay 132 is configured to be mechanically coupled to the second chain stay 134 via a second connecting member 133 (not shown). In particular, the first and the second rear dropouts 130, 136 can be configured to be structurally coupled at the first and the second connecting members 127, 133, respectively, via a welding joint. In a non-limiting example, the first and the second seat stays 126, 132 may be formed from double-butted tubing or rectangular cross-section beams, selected from high-strength steel, thermoset resin-infused aramid composites, or aluminium alloy profiles with cold-worked ends. The first and the second chain stays 128, 134 and the first and the second seat stays 126, 132 may be joined to the dropouts using TIG welding, friction stir welding, brazed lugs, or carbon-overwrapped inserts for monocoque composite constructions.

In some embodiments, the first seat stay 126, the first chain stay 128, and the first rear dropout 130 are positioned on a first side of the wheel 102, and the second seat stay 132, the second chain stay 134, and the second rear dropout 136 are positioned on a second side of the wheel 102 that is opposite to the first side of the wheel 102. The aforementioned bilateral structural symmetry permits the wheel 102 to remain concentrically positioned relative to the main frame 122 and contributes to even load transfer during turning, climbing, and impact scenarios during operation of the wheeled device. Furthermore, the first and the second rear dropouts 130, 136 may be constructed as monolithic blocks, open-lug profiles, or modular mounting plates. In one embodiment, the first and the second rear dropouts 130, 136 may be manufactured using cast stainless-steel for corrosion resistance and structural reliability. In another embodiment, CNC-machined billet aluminium may be used for manufacturing of the first and the second rear dropouts 130, 136, in applications where weight savings and precision alignment are required. In certain implementations, the first and the second rear dropouts 130, 136 may be injection moulded using glass fiber-reinforced polyamide with integrated metallic inserts for fastener threading.

The spacing segment 116 of the extension structure 118 is in direct contact with and extends from the first rear dropout 130 of the main frame 122. The spacing segment 116 may be configured to project laterally outward and diagonally downward from the first rear dropout 130, depending on a clearance, braking force vector orientation, and application-specific geometry of the wheeled device. The direct contact may be achieved by mating flanges, flush interfaces, or saddle brackets integrally cast into the first rear dropout 130. In some embodiments, the spacing segment 116 may be attached to the second rear dropout 136 in a similar manner as to the first rear dropout 130.

Moreover, the spacing segment 116 of the extension structure 118 is optionally fixedly attached to the first rear dropout 130 of the main frame 122. The extension structure 118 and the first rear dropout 130 may form an integral, seamless, monolithic or unitary piece. The aforementioned fixed attachment may be accomplished by metallurgical bonding, such as TIG welding or brazing, mechanical bonding, such as use of blind rivets, threaded inserts, compression plates, or chemical bonding, such as epoxy resins and structural acrylic adhesives. A joint interface may be designed with fillets, reinforcing gussets, or triangular web extensions to prevent stress concentration under dynamic engagement of the brake mechanism. In some embodiments, the first rear dropout 130 is positioned at an end of the first seat stay 126 and at an end of the first chain stay 128, and the second rear dropout 136 is positioned at an end of the second seat stay 132 and at an end of the second chain stay 134. The foregoing configuration permits the construction of a mechanically triangulated structure, where the first and the second rear dropouts 130, 136 function as load junction nodes between vertical members such as the seat tube 124 and horizontal members such as the first and the second chain stays 128, 134. Each connection point may be strengthened by external lugs, internal sleeve couplers, and interference press-fit collars to preserve structural rigidity during rotation and braking engagement of the wheel 102 and the brake mass structure 115.

In some implementations, the seat tube 124, the first chain stay 128, and the second chain stay 134 may be co-moulded with the dropout via continuous fiber wrap techniques in carbon composite frames. In metallic structures, fish mouth cuts may be used at junction interfaces to increase weld surface area and prevent misalignment during fabrication. The first and the second rear dropouts 130, 136 may further include eyelets or fixture bosses for attaching auxiliary components such as fenders, cargo racks, and sensor mounts, without interfering with the brake system 100 including the brake mass structure 115 and the spacing segment 116.

In order to enhance structural performance of an interface of the main frame 122 and the first rear dropout 130 under braking loads, additional design features may be integrated. The aforesaid design features may include dual-thickness reinforcement bands, ribbed gussets between the first chain stay 128 and the first rear dropout 130, and splined dropout faces that lock against anti-rotation tabs on the hub 104. For modular systems, replaceable dropout inserts may be used to provide interchangeability between brake-compatible and non-brake configurations of the wheeled device. The integration of the main frame 122, the first and the second rear dropouts 130, 136, and the extension structure 118 supports positional requirements of the brake system 100. The foregoing configuration maintains consistent radial and axial alignment between the hub 104, the rod 110, brake mass structure 115, and the hook segment 120 during both idle and operational states of the wheeled device.

Figure 2C:
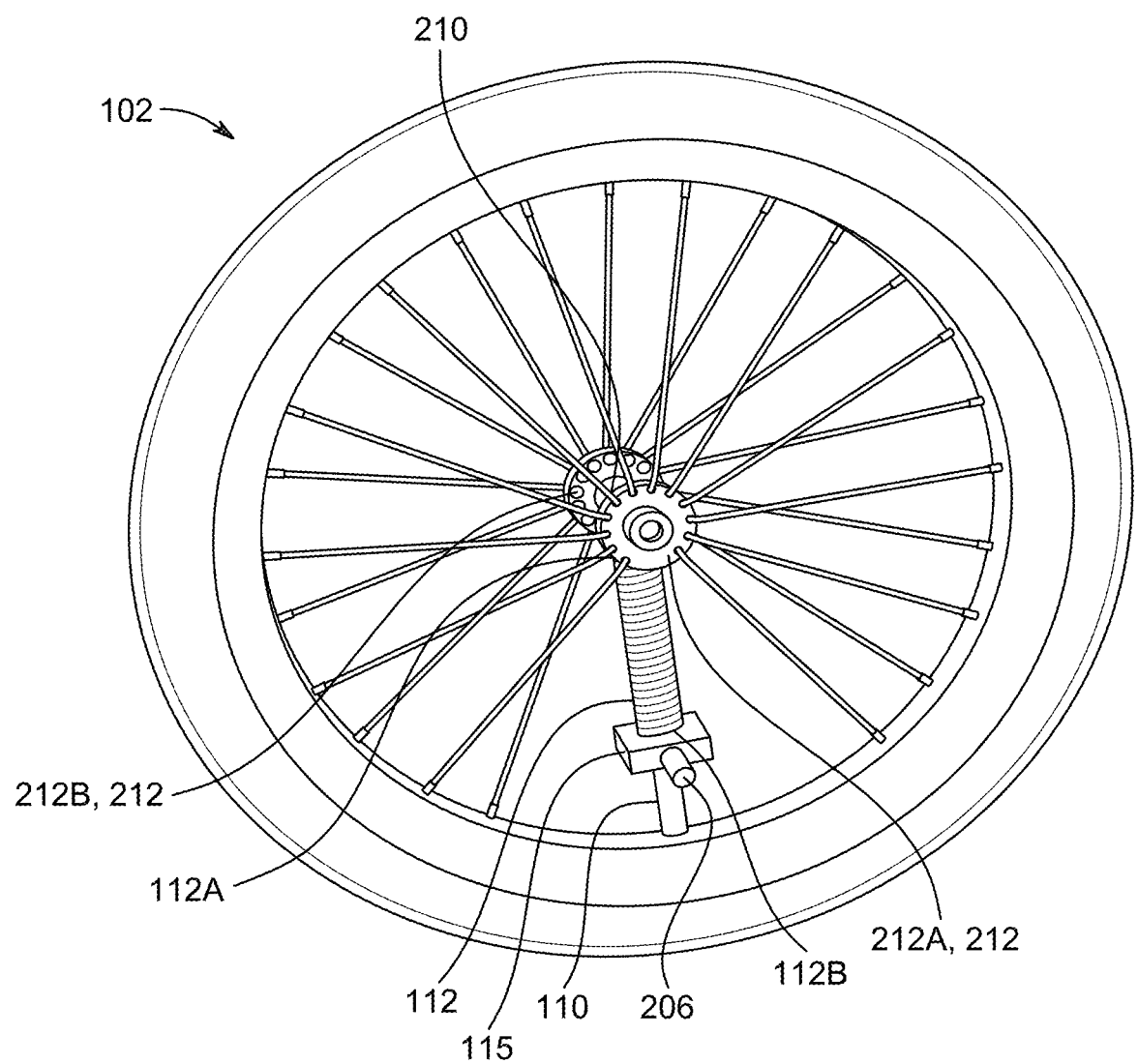
FIG. 2C illustrates a schematic of a brake system for a wheel, according to certain embodiments.

Further, FIG. 2C illustrates a detailed structural diagram of the brake mass structure 115, according to certain embodiments. As can be seen from FIGS. 1A and 2C, the brake mass structure 115 is mechanically coupled to the free end 112B of the helical spring 112. In some embodiments, the brake mass structure 115 is capable of moving along the longitudinal direction of the rod 110 in response to centrifugal forces arising from the rotational movement of the wheel 102 caused by rotation of the wheel 102 during operation of the wheeled device. The brake mass structure 115 may be constructed from dense materials such as hardened steel, tungsten alloys, or sintered metal composites to provide sufficient mass for actuation under predetermined centrifugal force thresholds. Referring to FIG. 2B, the brake mass structure 115 includes a plate 202 having a through-hole 204 formed therein, and the brake mass structure 115 includes a pin structure 206, which may be integrally formed or attached to the brake mass structure 115 through welding, brazing, friction stir welding, adhesive bonding, or mechanical interlocking using press-fit or keying arrangements. In certain embodiments, the pin structure 206 may be fabricated from wear-resistant materials such as carburized steel or ceramic composites to withstand repetitive mechanical impacts during engagement.

In particular, the plate 202 may be designed to act as a central support member that maintains structural coherence and enables axial translation of the brake mass structure 115. The rod 110 extends through the through-hole 204, permitting the brake mass structure 115 to move in a linear direction along the longitudinal axis of the rod 110 under the influence of centrifugal force generated during rotation of the wheel 102. The plate 202 may adopt various geometrical configurations, including circular, elliptical, polygonal, rectangular, or irregular profiles, depending on the desired mass distribution, space constraints, and aesthetic considerations. The plate 202 may be formed from a high-density material selected to ensure sufficient inertial mass for actuation of braking mechanism of the brake system 100. Suitable materials include hardened structural steel such as AISI 1045 or 4140), tungsten heavy alloys, cast ductile iron, brass alloys, or high-strength aluminium alloys such as 7075-T6 or A356. In some embodiments, a layered or laminated structure may be used, such as a sandwich composite including a steel core bonded between aluminium outer layers, in order to augment mass and shock absorption while reducing cost and corrosion.

The through-hole 204 may be circular or elliptical, with inner dimensions machined to establish a controlled clearance fit around the rod 110. The tolerance between the rod 110 and an inner diameter of the through-hole 204 may be defined based on expected thermal expansion, dynamic vibration, and axial displacement requirements associated with the brake system 100. In some embodiments, an inner surface 204A of the through-hole 204 may be lined with a low-friction bushing, such as a polytetrafluoroethylene (PTFE) sleeve, an ultra-high molecular weight polyethylene (UHMWPE) insert, a sintered bronze bearing, or a precision polymeric liner. Such inserts reduce friction, prevent galling, and may provide near friction-less reciprocating motion during operation of the wheel 102. In high-load applications, the through-hole 204 may further incorporate metallic bearing races or self-lubricating liners composed of composite tribological materials such as graphite-impregnated nylon or PTFE-bronze blends.

An interface between the rod 110 and the through-hole 204 may be configured as a precision slip fit, a kinematic guide fit, or a low-tolerance sliding fit based on ISO or ANSI standards, depending on mechanical performance requirements. In some embodiments, the rod 110 may be coated with anti-wear surface treatments such as hard anodizing, diamond-like carbon (DLC) coatings, or low-friction dry-film lubricants such $MoS_2$ or graphite in order to reduce wear and improve lifetime under cyclic engagement.

The pin structure 206 may be implemented as a cylindrical projection fixedly attached to the plate 202. The longitudinal axis of the pin structure 206 is oriented orthogonally to the axis of the rod 110. The perpendicular orientation of the pin structure 206 facilitates mechanical engagement with the hook segment 120 and provides application of force across a contact profile of a groove 208 formed in the hook segment 120. The cylindrical geometry of the pin structure 206 may be achieved via precision turning, extrusion, or powder metallurgy processes, followed by post-machining or surface hardening.

In some embodiments, the pin structure 206 may extend outwardly from a lateral face of the plate 202. The longitudinal direction of the pin structure 206 remains parallel to the plate 202 and perpendicular to the axis of the rod 110. The aforesaid lateral extension permits projection into the groove 208 of the hook segment 120 under centrifugal displacement, establishing a passive locking interaction between rotating elements such as the wheel 102 and stationary elements such as the hook segment 120. The attachment between the pin structure 206 and the plate 202 may be realized via welding including TIG, MIG, or friction welding, interference press-fitting into a pre-machined bore, bolted assembly with torque control, or as an integrally cast feature during formation of the plate 202. Further, the pin structure 206 may be fabricated from hardened tool steels such as AISI D2 or O1, sintered alloy steels, nitride stainless steel, or thermally treated high-carbon steel to ensure fatigue resistance and mechanical durability during repeated engagement cycles. A surface of the pin structure 206 may incorporate chamfers or radii to facilitate entry into the groove 208 and reduces stress concentration during locking.

As shown in FIGS. 1C and 2C, the hub 104 of the wheel 102 can include a hub axle 210 and two hub flanges 212, including a first hub flange 212A and a second hub flange 212B, spaced along a longitudinal direction of the hub axle 210 that is perpendicular to a plane of the rim 106. The hub axle 210 functions as a central rotational axis of the wheel 102 and is configured as a primary load-bearing component of the wheel 102 that interfaces with the components mounted on the main frame 122, including the first and the second rear dropouts 130, 136. The hub axle 210 may be cylindrical in cross-section and may be formed as a hollow or solid shaft depending on weight and stiffness considerations associated with the wheeled device. Further, as can be seen from FIGS. 1A, 2A and 2C, the main frame 122 is attached to the hub axle 210 of the wheel 102 via the first rear dropout 130 and the second rear dropout 136. The hub axle 210 of the wheel 102 may be retained within vertical or rearward-facing slots formed within the dropouts, using compression nuts, locking washers, cam-lock mechanisms, or integrated skewer clamps. In heavy-duty applications such as powered mobility devices or industrial carts, the hub axle 210 may include keyed engagement slots that mate with anti-rotation inserts embedded within the first and the second rear dropouts 130, 136.

The material selection for the hub axle 210 may vary according to the operational demands of the wheeled device. In lightweight applications such as bicycles or mobility aids, the hub axle 210 may be fabricated from aluminium alloys such as, but not limited to, 6061-T6, 7075-T6, and 2024-T3, which offer desirable strength-to-weight ratios and corrosion resistance. In certain industrial applications, the hub axle 210 may be formed from medium-carbon steels such as AISI 1045, cold-drawn seamless steel tubing, chrome-molybdenum alloys, and nickel-based superalloys in cases where thermal or chemical resistance is required. In some embodiments, the hub axle 210 may incorporate coatings such as hard chrome, phosphate treatment, and anodized oxide layers to enhance surface hardness, wear resistance, and fatigue life under repeated torque cycles. The hub axle 210 may include end interfaces such as threads, splines, quick-release fittings, and clamping collars for securing the hub axle 210 to the main frame 122. In one embodiment, the hub axle 210 may be integrated into a bearing housing, which may permit free rotation of the wheel 102 about a fixed support structure. In another embodiment, the hub axle 210 may rotate with the wheel 102 while supported by sealed ball bearings, tapered roller bearings, and sleeve bearings.

The two hub flanges 212 are longitudinally spaced apart along the hub axle 210 and extend radially outward from a central portion of the hub axle 210. The two hub flanges 212 serve as the anchor points for the spokes 108 of the wheel 102 and are configured to distribute radial and torsional loads from the rim 106 to the hub axle 210. The spacing between the two hub flanges 212 defines a width of a bed of spokes 108 and contributes to triangulation and lateral stiffness of the wheel 102. A wider flange spacing may improve lateral strength and torsional resistance, whereas narrower spacing may reduce weight and aerodynamic drag of the wheel 102.

The first and the second hub flanges 212A, 212B may be disc-shaped, elliptical, or feature spoked cutouts to reduce mass while preserving structural integrity. The two hub flanges 212 may be integrally machined with the hub axle 210 as a single-piece assembly, or may be joined by welding, press-fitting, or bolted flanges. The outer circumference of each of the two hub flanges 212 may include a set of circumferentially spaced holes or slots for attachment of the spokes 108. The aforementioned holes may be straight-drilled, countersunk, or chamfered to accommodate various spoke heads and reduce stress risers at a surface of the two hub flanges 212. In some embodiments, the rod 110, which serves as the guide structure for the brake mass structure 115, is attached to the rim 106 and the hub axle 210. The rod 110 extends radially outward from a connection point on the hub axle 210 to a location on the rim 106. The above-described radial positioning aligns the rod 110 with the centrifugal force vector during wheel rotation and provides a stable linear path along which the brake mass structure 115 can translate. The attachment at the hub axle 210 may be achieved through direct welding to a bracket protrusion, insertion into a radial bore, or bolted connection to a mounting lug. In some embodiments, the rod 110 may be bonded with structural adhesives, or thermally joined via brazing or ultrasonic welding.

In some embodiments, at an outer end, the rod 110 terminates at an inner surface of the rim 106. The attachment to the rim may involve a press-fit sleeve, a threaded insert, a bolted clamp, or a moulded socket formed into the rim material. In implementations where the rim 106 is metallic, the rod 110 may be joined via gas-metal arc welding and friction stir welding. In composite rims, such as those formed from carbon fiber or glass fiber laminates, the rod 110 may be embedded within a laminate layup, inserted into a cured socket lined with reinforcement materials. Further, the rod 110 may possess high tensile strength and high compressive strength, along with high stiffness, and high fatigue resistance, as the rod 110 is configured to support a motion of the brake mass structure 115 under high-velocity and high-acceleration conditions. Suitable materials for the rod 110 may include, but are not limited to, hardened steel shafts, titanium alloys, stainless steel grades such as AISI 316 or 440C, and filament-wound composite tubes made of carbon or aramid fibres. Surface treatments such as nickel plating, PTFE coating, and diamond-like carbon (DLC) application may be employed to reduce friction, prevent corrosion, and increase wear resistance in sliding contact with the brake mass structure 115.

In some embodiments, the spokes 108 are attached to the rim 106 and at least one of the two hub flanges 212. The spokes 108 provide structural tension that connects the periphery of the rim 106 to the two hub flanges 212 and maintain concentric alignment of the rim 106 during dynamic loading of the wheel 102. The spokes 108 may extend linearly between the two hub flanges 212 and the rim 106, with arrangements such as radial lacing, 1-cross, 2-cross, or 3-cross configurations depending on desired torsional stiffness and aesthetic preference required from the wheeled device. An attachment of the spokes 108 to the two hub flanges 212 may be accomplished by inserting a hooked head into the holes included in the two hub flanges 212 as defined above, secured with a spoke washer (bushing) to reduce surface damage and distribute load. An opposite end of the spokes 108 may be threaded and inserted into a nipple, which threads into a bed of the rim 106 and permits for tension adjustment using a spoke wrench. In some implementations, the spokes 108 may be bonded or riveted directly into composite rims.

The spokes 108 may be manufactured from cold-drawn stainless-steel wire, galvanized steel, aluminium alloy rods, titanium wires, and braided polymer cables encased in plastic sheathing. In certain high velocity applications of the wheel 102, the spokes 108 may be butted to reduce mass and aerodynamic drag. A number of the spokes 108 is not particularly limited and may for example range from 16 to 64, with even distribution across the two hub flanges 212 outside the aforementioned spoke-free zone, however, asymmetrical lacing may be used to accommodate torque-dominant sides in geared systems and motorized hubs. In preferred configurations, the spokes 108 are symmetrically distributed between the two hub flanges 212 outside the spoke-free zone in order to balance lateral loads and improves stiffness. Moreover, a combination of the two hub flanges 212, the rod 110 which is radially mounted, and the spokes 108 which are symmetrically laced, provides balance and structural reliability to the wheel 102 capable of supporting the brake system 100 described herein. The foregoing configuration maintains structural rigidity, resists deformation during acceleration and braking, and ensures accurate positioning of the brake mass structure 115 relative to the hook segment 120. The said design supports high durability and reliability across varied use cases, including bicycles, medical wheelchairs, industrial carts, and recreational transport devices.

Figure 3A:
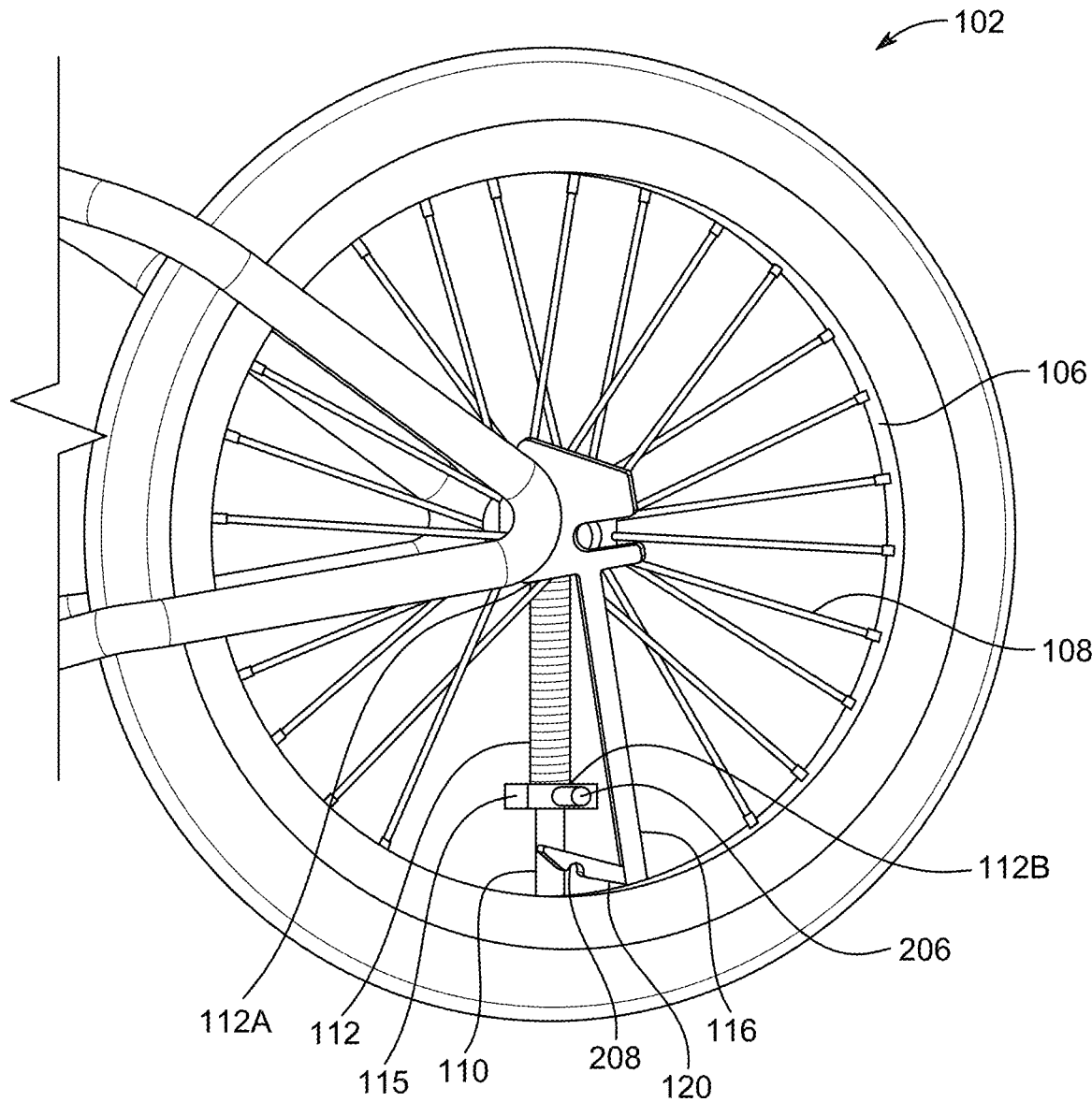
FIG. 3A illustrates a schematic of the brake system in a disengaged state, according to certain embodiments.
Figure 3B:
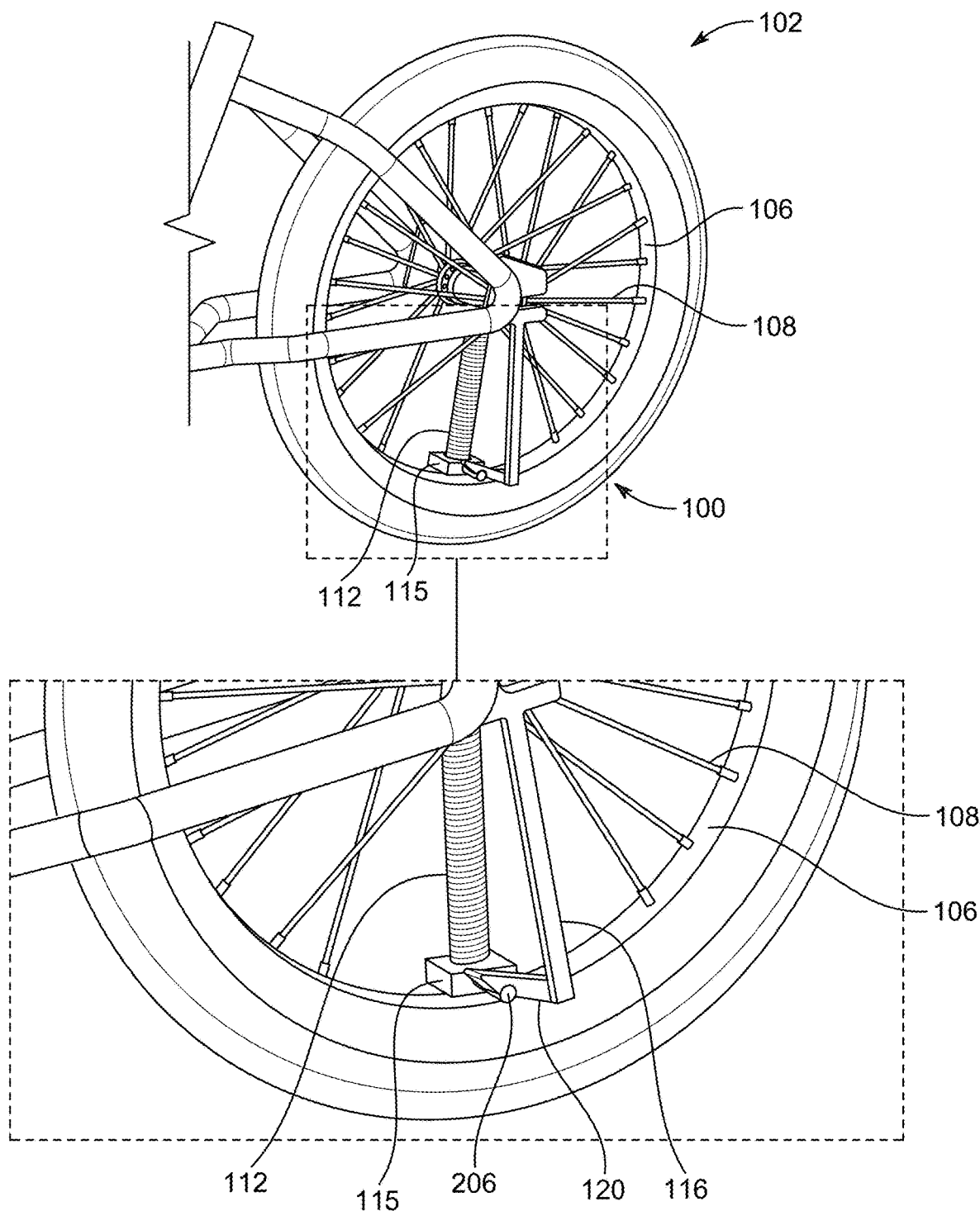
FIG. 3B illustrates a schematic of the brake system in an engaged state, with an enlarged inset depicting an engagement of a pin structure and a groove, according to certain embodiments.

FIGS. 3A-3B illustrate disengaged and engaged states of the brake system 100, respectively, according to certain embodiments. As such, during operational use, when the wheel 102 rotates, centrifugal force acts upon the brake mass structure 115, causing displacement of the brake mass structure 115 along the longitudinal direction of the rod 110 away from the hub 104. In other words, when the wheel 102 rotates, the brake mass structure 115 is configured to move away from the hub 104 along the longitudinal direction of the rod 110. Specifically, the helical spring 112 permits controlled axial movement of the brake mass structure 115 while maintaining a restorative force opposing displacement. In some embodiments, the longitudinal direction of the rod 110 is along a gravity direction and the free end 112B of the helical spring 112 points towards a ground. When the rotational speed of the wheel 102 reaches or exceeds a predefined speed threshold, the centrifugal force exerted on the brake mass structure 115 and gravity together overcome the restoring force of the helical spring 112, thereby permitting the brake mass structure 115 to travel to a position where the pin structure 206 engages with the groove 208 of the hook segment 120 of the extension structure 118 to stop the wheel 102 from accelerating. Upon engagement of the pin structure 206 within the groove 208, relative rotational movement between the wheel 102 and the main frame 122 is arrested. The engagement of the pin structure 206 and the groove 208 prevents further acceleration of the wheel 102. In other embodiments, the rod 110 is oriented in a different direction and/or the free end 112B of the helical spring 112 points in a different direction, gravity, partially or wholly, may act to move the brake mass structure 115 towards or away from the hub 104.

The helical spring 112 exerts a restoring force that pulls the brake mass structure 115 towards the hub 104. In the disengaged state of FIG. 3A, the rotational speed of the wheel 102 is below a predetermined speed threshold, and the centrifugal force acting on the brake mass structure 115 and gravity together are insufficient to overcome an opposing spring force. The pin structure 206 remains disengaged from the groove 208 of the hook segment 120.

As can be seen from the engaged state of FIG. 3B, when the wheel 102 reaches or exceeds the predefined speed threshold, the centrifugal force acting on the brake mass structure 115, alone, in conjunction with gravity or against gravity, becomes sufficient to displace the brake mass structure 115 along the longitudinal axis of the rod 110. As a result, the pin structure 206 enters the groove 208 of the hook segment 120, producing mechanical engagement. As described above, the mechanical engagement causes the wheel 102 to decelerate by arresting further rotational acceleration and may eventually stop the wheel 102, depending on the application.

The predefined speed threshold at which the transition between the disengaged state as shown in FIG. 3A and the engaged state as shown in FIG. 3B occurs, may be analytically determined by the relationship (equation 4) as provided herein below. Assuming that the longitudinal direction of the rod 110 is along the gravity direction and the free end 112B of the helical spring 112 points towards the ground, the entirety of the gravity acts in conjunction with the centrifugal force against the restorative force of the helical spring 112, thus corresponding to a minimal centrifugal force required and a minimal speed that is also referred to as the speed threshold. The predefined speed threshold may be derived from equations 1, 2, and 3:

$$F_c = \frac{mv^2}{R} \tag{1}$$

$$F_g = mg \tag{2}$$

$$F_s = -kx \tag{3}$$

$$\text{Speed threshold} = \sqrt{\frac{R(kx - mg)}{m}} \tag{4}$$

Where '$F_c$' denotes a centrifugal force, 'm' denotes a mass of the brake mass structure 115, 'v' denotes a speed of the brake mass structure 115 or a rotational speed of the wheel 102, 'R' denotes a length of the rod 110 from the hub 104 to a point of potential engagement, '$F_g$' denotes a gravitational force of the brake mass structure 115, 'm' denotes a mass of the brake mass structure 115, and 'g' denotes the gravitational acceleration constant, '$F_s$' denotes a spring force of the helical spring 112, 'k' denotes the spring constant of the helical spring 112, and 'x' denotes a displacement of the helical spring 112 from an equilibrium position of the helical spring 112.

The equation 4 allows a designer to tune the brake system 100 by adjusting stiffness of the helical spring 112, mass of the brake mass structure 115, and length of the rod 110 to suit specific operational parameters, including target vehicle speed, response delay, and terrain slope conditions.

It should be understood that the equation 4 is an approximation or estimate. In practice, the speed threshold may deviate from $$\sqrt{\frac{R(kx - mg)}{m}}.$$

For example, the derivation process of the equation 4 neglects the mass of the helical spring 112, which is assumed to be negligible compared with the mass of the brake mass structure 115 which can be constructed from dense materials. The derivation process of the equation 4 also neglects frictional force between the rod 110 and the brake mass structure 115. As a result, the speed threshold in practice may be in a range of $$0.6\sqrt{\frac{R(kx - mg)}{m}} \text{ to } 1.5\sqrt{\frac{R(kx - mg)}{m}} \text{ such as } 0.6\sqrt{\frac{R(kx - mg)}{m}},$$

$$0.7\sqrt{\frac{R(kx - mg)}{m}} \ 0.8\sqrt{\frac{R(kx - mg)}{m}} \ 0.9\sqrt{\frac{R(kx - mg)}{m}}, \sqrt{\frac{R(kx - mg)}{m}},$$

$$1.1\sqrt{\frac{R(kx - mg)}{m}}, 1.3\sqrt{\frac{R(kx - mg)}{m}}, 1.5\sqrt{\frac{R(kx - mg)}{m}},$$

or any values therebetween.

Furthermore, the engagement event depicted in FIG. 3B occurs passively, without necessarily relying on active sensing mechanisms. In some embodiments, the brake system 100 does not include pressure sensors, force sensors, or speed sensors. The entire speed control process relies solely on movement of the brake mass structure 115 and elastic characteristics of the helical spring 112 in combination with the mechanical constraints defined by the extension structure 118. Of course, a user may optionally include pressure sensors, force sensors, speed sensors and/or the like, for example as a backup or fail-safe protection mechanism.

More specifically, the brake system 100 can be configured without any sensor that detects rotational speed, force, component displacement, or other dynamic variables for the purpose of triggering the braking event. The brake system 100 can omit all electronic sensing devices, such as optical encoders, Hall-effect sensors, piezoelectric strain gauges, or MEMS accelerometers. An absence of such components reduces complexity, enhances durability in adverse environmental conditions, and prevents dependence on electrical subsystems, increasing reliability in emergency scenarios such as downhill acceleration or user incapacitation which may be a case in wheelchair applications. In some embodiments, no sensors are positioned on any portion of the brake system 100, including the main frame 122, the extension structure 118, or the wheel 102. In some embodiments, no sensors are needed to detect any property associated with the brake system 100, including the main frame 122, the extension structure 118, or the wheel 102.

The configuration shown in FIGS. 3A-3B thus demonstrates a transition between a disengaged and an engaged braking state, governed entirely by mechanical thresholds and spatial geometry. In an exemplary embodiment, the wheel 102 may belong to a wheelchair system where the braking threshold corresponds to a wheel speed of approximately 15 miles per hour (approximately 6.7 meters per second). In another exemplary embodiment, the wheel 102 may be incorporated into a baby stroller, a pushcart, or a mobility aid cart designed to operate safely over sloped terrains or uneven surfaces. In one embodiment, the groove 208 in the hook segment 120 may adopt a semi-circular or part-cylindrical geometry, dimensioned to receive the cylindrical pin structure 206 when engaged. The groove 208 may be machined, cast, or broached into the hook segment 120. The radial curvature and depth of the groove 208 may be matched to the diameter of the pin structure 206, allowing for secure engagement under impact loading. A clearance of 0.05 mm to 0.5 mm (e.g. 0.05 mm, 0.07 mm, 0.1 mm, 0.2 mm, 0.3 mm, 0.4 mm, 0.5 mm or any values therebetween) may be maintained to prevent interference while ensuring positional accuracy. In some embodiments, the groove 208 may incorporate energy-dissipating materials, such as elastomeric linings, thermoplastic polyurethane inserts, or thermally fused shock-absorbing polymers, to cushion impact and reduce wear during engagement.

In high-duty applications, the groove 208 may be formed in hardened alloy steel or cast iron and finished with a carburized, nitrided, or hard-chromed surface to improve hardness, suppress deformation, and prevent brinelling. The hook segment 120 may further includes reinforcement ribs or gussets to prevent deformation of the groove 208 under repeated high-load conditions.

Figure 4:
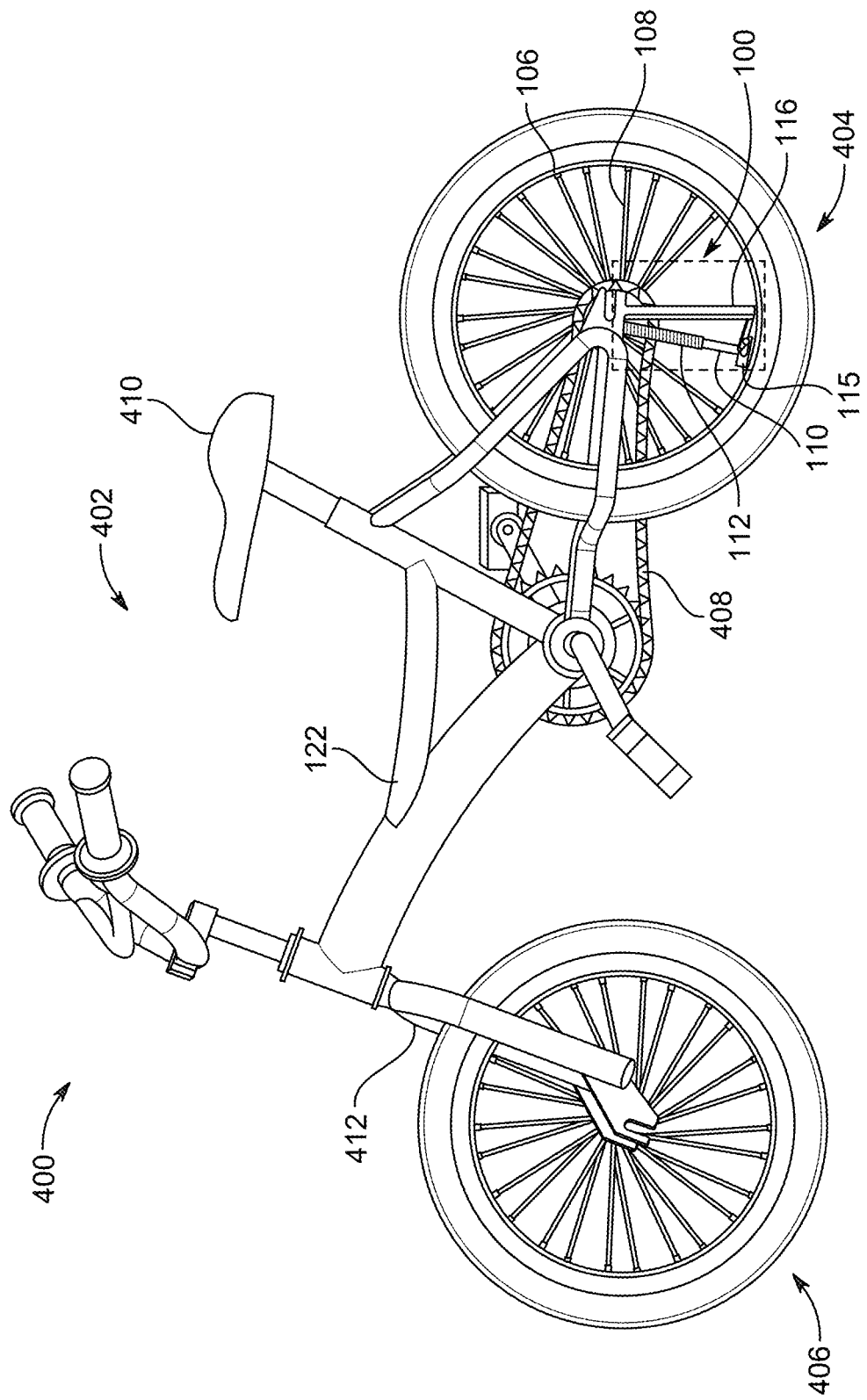
FIG. 4 illustrates an exemplary schematic perspective view of a bicycle with the brake system disposed on at least one wheel of a pair of wheels of the bicycle, according to certain embodiments.

Referring to FIG. 4, a schematic diagram of a wheeled device 400 is depicted, according to certain embodiments. The wheeled device 400 is implemented as a bicycle, denoted generally as the "bicycle 402". In one embodiment, the bicycle 402 includes the brake system 100 disposed on at least one wheel of a pair of wheels included in the bicycle 402. For example, the wheel 102 can be a rear wheel 404 of the bicycle 402, and the bicycle 402 further includes a front wheel 406 connected to the main frame 122. In other words, the bicycle 402 includes the pair of wheels (404, 406), the main frame 122, a drivetrain 408, and a user seating structure 410, where the brake system 100 as described above is integrated with the rear wheel 404 of the bicycle 402. The rear wheel 404 is rotationally supported by rear triangular structures formed by the main frame 122 of the bicycle 402, as previously described, including the first and the second seat stays 126, 132, the first and the second chain stays 128, 134, and the first and the second rear dropouts 130, 136. The hub axle 210 of the rear wheel 404 is mounted within the first and the second rear dropout 130, 136 of the main frame 122 by retention mechanisms such as axle nuts, thru-axles, or quick-release skewers.

The brake system 100 disposed on the rear wheel 404 can operate autonomously and passively, in the absence of electronic sensors or rider input, relying solely on centrifugal displacement of the brake mass structure 115 to engage braking event upon exceeding the defined speed threshold. The configuration as mentioned herein provides a redundant braking solution in emergency scenarios, such as unconscious rider descent, brake cable failure, or downhill acceleration beyond a safe threshold. The brake system 100 passively engages when the angular velocity of the rear wheel 404 reaches a predefined critical limit, based on mass, spring stiffness, and radial geometry.

The bicycle 402 further includes the front wheel 406 connected to the main frame 122, typically through a front fork assembly 412. The front wheel 406 may be a conventional spoked wheel or a cast-moulded structure and may include a standard hub with ball or cartridge bearings. In some embodiments, the front fork assembly 412 may be of the rigid or suspension type and may be attached to a head tube of the main frame 122 via a headset bearing assembly. As such, connection between the front wheel 406 and the main frame 122 enables steering and directional control of the bicycle 402 and may optionally include disc brakes or calliper rim brakes, independently operable from the brake system 100 located on the rear wheel 404.

In some embodiments, the main frame 122 of the bicycle 402 may be formed from lightweight structural materials such as butted steel tubing, hydroformed aluminium, carbon fiber-reinforced polymers, or titanium alloys. A geometry of the main frame 122 may be configured for various applications such as city commuting, mountain biking, road cycling, or mobility assistance. Further, the rear wheel 404 incorporating the brake system 100 may use high-tension stainless steel spokes, deep-section aluminium rims, or double-wall rims reinforced for added torsional stiffness. The two hub flanges 212 may be drilled or slotted to allow conventional spoke lacing patterns such as three-cross or radial, enabling compatibility with standard bicycle wheel-building techniques. The brake mass structure 115 may be tuned in mass and inertia based on a type of the bicycle 402 and expected load, ensuring that the speed threshold for engagement corresponds to real-world danger conditions, such as speeds exceeding 6 m/s to 8 m/s for urban use or up to 10 m/s for high-speed sport configurations. In some embodiments, the bicycle 402 may include gear shifting systems, suspension components, or auxiliary electronics, which operate independently of the brake system 100 described herein. The brake system 100 is configured to remain functional in the absence of electronic control or hydraulic pressure, thereby offering fail-safe engagement or in conjunction with additional electronic and/or mechanical control.

The aspects of the present disclosure provide the brake system 100 for wheeled devices which is structurally integrated, sensor-independent, exemplified through an application in the rear wheel 404 of the bicycle 402. As disclosed herein, the brake system 100 utilizes mechanical components configured to respond to rotational speed without reliance on external control signals, actuators, or electronic monitoring. The arrangement of the brake mass structure 115, helical spring 112, and extension structure 118 achieves passive engagement based on centrifugal force thresholds, providing autonomous braking under predefined conditions. The disclosed configuration is configured to provide operational reliability under diverse usage environments and accommodates a range of construction materials and assembly techniques without departing from the underlying inventive concept. While the embodiments described herein relate primarily to bicycles, the brake system 100 remains applicable to various mobility platforms and wheeled apparatuses, including those not explicitly illustrated.

Figure 5:
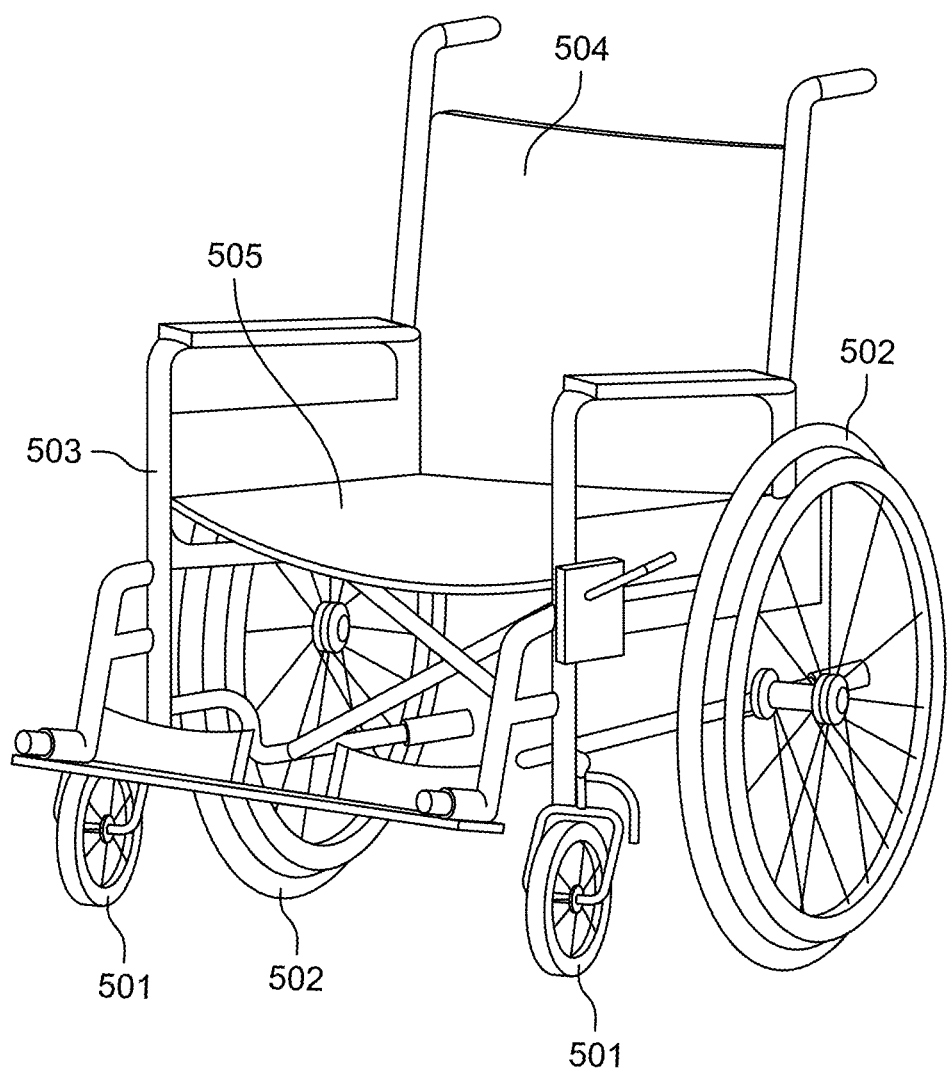
FIG. 5 shows a wheelchair, according to certain embodiments.

Referring to FIG. 5, a schematic diagram of a wheelchair having front wheels (501), rear wheels (502), frame (503), a back rest (504) and a seat (505).

Numerous modifications and variations of the present disclosure are possible in light of the above teachings. It is therefore to be understood that within the scope of the appended claims, the invention may be practiced otherwise than as specifically described herein.

The invention claimed is:

1. A wheelchair with emergency brake system, comprising:
   a wheelchair and a brake system;
   wherein the wheelchair has a braking wheel equipped with the brake system,
   wherein the wheelchair comprises a main frame, a seat supported by the main frame, an upper frame, a backrest supported by the upper frame, two front wheels connected to the main frame and two rear wheels connected to the main frame, wherein the braking wheel is a one of the two rear wheels;
   wherein the braking wheel comprises
      a hub,
      a rim,
      spokes extending between the hub and the rim,
      a rod extending between the hub and the rim,
      a helical spring surrounding the rod and having a fixed end attached to the hub and a free end capable of moving along a longitudinal direction of the rod, and
      a brake mass structure attached to the free end of the helical spring, being capable of moving along the longitudinal direction of the rod and comprising a pin structure;
   wherein the main frame is connected to the hub of the braking wheel; and
   an extension structure comprising
      a spacing segment that extends from the main frame, and
      a hook segment spaced apart from the hub by the spacing segment and having a groove formed therein which is configured to engage with the pin structure of the brake mass structure;
   wherein when the braking wheel rotates, the brake mass structure is configured to move away from the hub along the longitudinal direction of the rod,
   wherein when the braking wheel rotates at or above a speed threshold, the brake mass structure is configured to move away from the hub along the longitudinal direction of the rod so that the pin structure of the brake mass structure engages with the groove of the hook segment of the extension structure to stop the wheelchair from accelerating.

2. The wheelchair of claim 1, wherein:
   the brake mass structure comprises a plate having a through-hole formed therein,
   the rod extends through the through-hole so that the brake mass structure is capable of moving along the longitudinal direction of the rod,
   the pin structure is cylindrical, and
   a longitudinal direction of the pin structure is perpendicular to the longitudinal direction of the rod.

3. The wheelchair of claim 2, wherein the pin structure extends outwardly from the plate, and the longitudinal direction of the pin structure is parallel to the plate.

4. The wheelchair of claim 3, wherein the groove of the hook segment is semi-circular and capable of accommodating the pin structure.

5. The wheelchair of claim 1, wherein the hub comprises a hub axel and two hub flanges spaced along a longitudinal direction of the hub axel that is perpendicular to a plane of the rim.

6. The wheelchair of claim 5, wherein the rod is attached to the rim and the hub axel.

7. The wheelchair of claim 6, wherein the spokes are attached to the rim and at least one of the two hub flanges.

8. The wheelchair of claim 6, wherein the spacing segment of the extension structure is in direct contact with and extends from the main frame.

9. The wheelchair of claim 8, wherein the spacing segment of the extension structure is fixedly attached to the main frame.

10. The wheelchair of claim 1, wherein the speed threshold is determined $$by\sqrt{\frac{R(kx - mg)}{m}},$$

in which:
   R is a length of the rod,
   k is a spring constant of the helical spring,
   x is a displacement of the helical spring from an equilibrium position of the helical spring,
   m is a mass of the brake mass structure, and
   g is a gravitational constant.

11. The wheelchair of claim 1, wherein:
   the extension structure and the main frame are fixedly attached to each other and form one integral piece.

12. The wheelchair of claim 1, wherein:
   when the braking wheel rotates at or above the speed threshold, the brake mass structure is configured to move away from the hub along the longitudinal direction of the rod so that the pin structure of the brake mass structure engages with the groove of the hook segment of the extension structure to stop the braking wheel from rotating.

13. The wheelchair of claim 1, wherein:
   the brake system does not include a pressure sensor, a force sensor or a speed sensor.

14. The wheelchair of claim 1, wherein:
   the brake system does not include a sensor that is configured to measure a property when the braking wheel rotates at or above the speed threshold, the brake mass structure is configured to move away from the hub along the longitudinal direction of the rod so that the pin structure of the brake mass structure engages with the groove of the hook segment of the extension structure to stop the wheelchair from accelerating.

15. The wheelchair of claim 1, wherein:
the brake system does not include a sensor positioned on the main frame, the extension structure or any wheel of the wheelchair.

\* \* \* \* \*